Feb. 27, 1962　　　　　J. C. MACY　　　　　3,022,511
PELLICLE FASTENER

Filed May 20, 1954　　　　　　　　　　　　　7 Sheets-Sheet 1

FIG. I.

INVENTOR
JAMES C. MACY

BY
Curtis, Morris & Safford.
ATTORNEYS

Feb. 27, 1962 J. C. MACY 3,022,511
PELLICLE FASTENER

Filed May 20, 1954 7 Sheets-Sheet 2

FIG. 2.

INVENTOR
JAMES C. MACY
BY
Curtis Morris Safford
ATTORNEYS

Feb. 27, 1962 J. C. MACY 3,022,511
PELLICLE FASTENER
Filed May 20, 1954 7 Sheets-Sheet 3

INVENTOR
JAMES C. MACY
BY
Curtis, Morris & Safford
ATTORNEYS

Feb. 27, 1962   J. C. MACY   3,022,511
PELLICLE FASTENER
Filed May 20, 1954   7 Sheets-Sheet 5

INVENTOR
JAMES C. MACY
BY
Curtis, Morris & Safford
ATTORNEYS

Feb. 27, 1962 — J. C. MACY — 3,022,511
PELLICLE FASTENER
Filed May 20, 1954 — 7 Sheets-Sheet 6

INVENTOR
JAMES C. MACY
BY
Curtis, Morris & Safford.
ATTORNEYS

Feb. 27, 1962 J. C. MACY 3,022,511
PELLICLE FASTENER
Filed May 20, 1954 7 Sheets-Sheet 7

INVENTOR
JAMES C. MACY
BY
Curtis, Morris & Safford
ATTORNEYS

United States Patent Office 3,022,511
Patented Feb. 27, 1962

3,022,511
PELLICLE FASTENER
James C. Macy, Westfield, N.J., assignor to Ideco Incorporated, Westfield, N.J., a corporation of New Jersey
Filed May 20, 1954, Ser. No. 431,176
11 Claims. (Cl. 1—68)

This invention relates to the fastening or sealing of flexible sheets, tubes, or pellicles and the like, and especially bags, sausage casings and other flexible containers.

An object of this invention is to provide for inexpensive fastening of pellicles.

Another object is to provide an improved fastener which can easily be applied to relatively delicate articles without damaging them.

The success, which is well known, of thin flexible casings used as food packages and the like has created a wide demand for a simple yet efficient fastening means. String knotted in loops by hand has been tried for this purpose but, although string is cheap, in the long run this way is expensive because of the labor cost. Certain difficulties peculiar to the fastening of thin flexible casings, have prevented the adaption for this purpose of known fasteners or have left much room for improvement and have limited development in this field.

Among these difficulties is the tendency of the relatively delicate casing walls to be torn or cut when constricted by metal bands or rings, especially when the folds of the casing are not easily gathered as is the case when fastening the mouth of a bag or tubular casing, as distinguished from a center part as between links of a continuous chain of sausages. Moreover, because the contents of such casings are frequently under some pressure, for example, when a sausage is being cooked, the fasteners must be strong enough to maintain effective seals under these conditions. Additional difficulties arise from the requirements that the fasteners be non-toxic and that they present a neat attractive appearance, and especially that it be economical to apply. All these requirements and difficulties are intended to be met and overcome by the present invention.

In accordance with the present invention, fastener stock having the attributes of rigidity and strength combined with ductility and pliability is obtained by attaching, in freely sliding relation to a flat strip or ribbon-like base of relatively stiff, substantially rigid but deformable material such as soft aluminum or other ductile metal, a relatively softer and advantageously more flexible facing, such as plastic. The term "rigid" is here used in the sense of effectively resisting ordinary forces encountered by the base. Thus by virtue of its rigidity the base, when forged around an article, is enabled to remain so forged. The term "ductile" as applied to the base is here used to designate the capacity of being bent in elastically when a sufficient force is imposed, as when the base is forged. Individual fasteners are made from this stock by cutting it into short lengths and then bending each into a closed loop around a pleated portion of the pellicle with the facing covering the inside and lateral edges.

Also in accordance with the invention, an automatic machine is provided which accepts this fastener stock in continuous form and applies it at high speed but under carefully controlled conditions to articles to be fastened. The fasteners produced in this way are strong, because of the stiff base, won't cut the fastened articles, because the base is prevented from contacting the article by the softer facing, and provide very tight seals, because the facing of the fastener is compressed tightly between the pleats of the fastened article and the encircling base. Moreover, because only the facing is in contact with the sealed article the fasteners are absolutely non-toxic and sanitary. By use of colored plastic facing it is easy to color-code the fastened articles to identify the contents of a particular casing.

In the accompanying drawings:

FIGURE 15 is an enlarged fragmentary view of the bending jaws in the position shown in FIGURE 14;

FIGURE 16 is an enlarged top view, with a portion broken away, of a completed fastener encircling an article (shown in dotted outline);

FIGURE 17 is a cross-section of FIGURE 16 taken along line 17—17;

FIGURE 18 illustrates the cross-section of a similar fastener formed into a different shape;

FIGURE 19 illustrates a still different shape of fastener;

FIGURE 20 illustrates in cross section, one embodiment of fastener stock from which the fasteners shown in FIGURES 16–19 can be formed;

Figure 1:
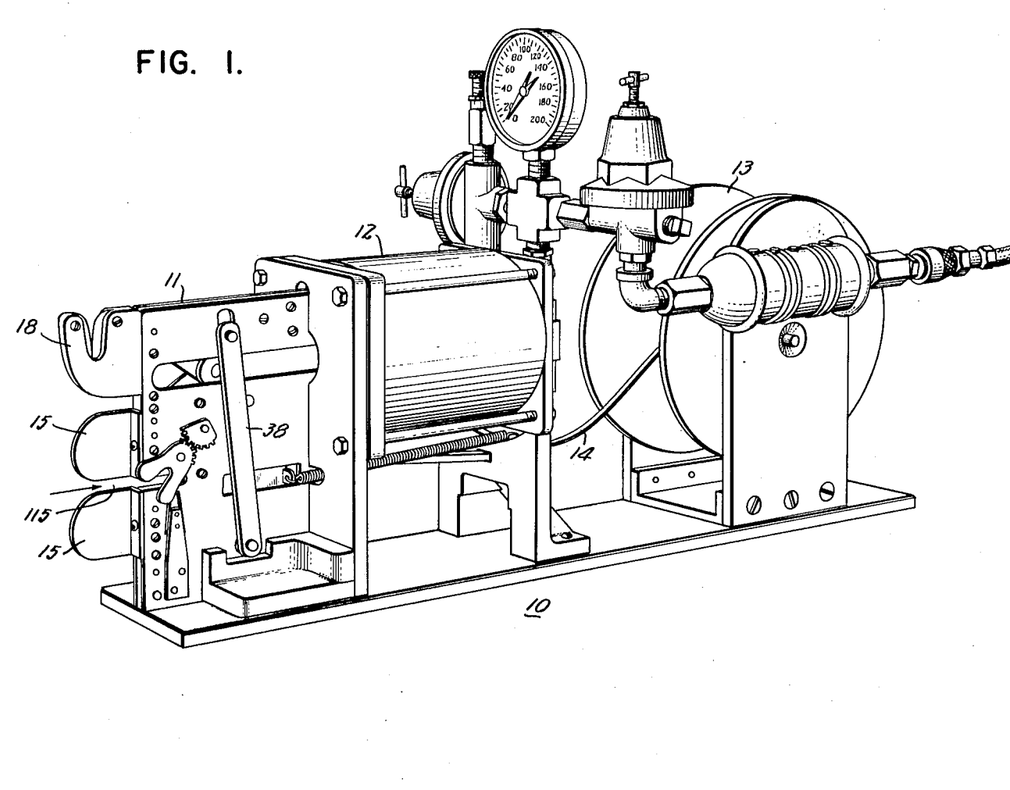
FIGURE 1 is a right front perspective view of an illustrative embodiment of an automatic fastening machine in accordance with the present invention.
Figure 2:
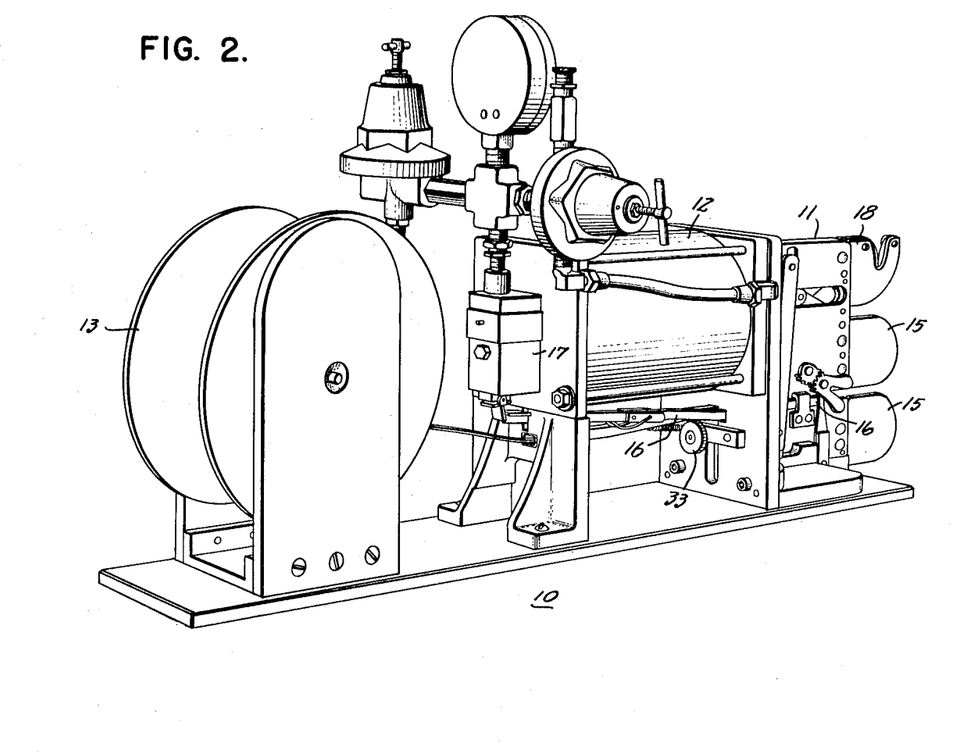
FIGURE 2 is a perspective view of the same embodiment, looking from the direction opposite to that in FIGURE 1.

Referring now particularly to the drawings, FIGURE 1 shows an illustrative embodiment of a fastening machine 10 in accordance with the invention. This machine includes a fastener forming mechanism 11, a hydraulic motor 12 together with its associated valves and piping and a supply drum 13 from which fastener stock 14 is fed in continuous strip form to the forming mechanism. Each casing to be fastened, with its folds permissibly somewhat more loosely pleated than when fastened, is inserted into the machine in the direction of the arrow through the guide slot between brackets 15 and, when properly positioned, is automatically encircled by a fastener which is formed and bent around it in one continuous operation by mechanism 11.

Motor 12, which supplies the power for this operation is actuated when an article to be fastened is pushed to the bottom of the slot between brackets 15 and switch 17 is depressed by the movement of feeler arm 16.

A V-shaped knife 18 is attached as shown, to the front of mechanism 11 to facilitate cutting off excess bag material.

Brackets 15 serve to gather and compress the bag material and guide it into slot 115 and to keep the contents of a filled casing out of said slot during fastening. The brackets 15 may be unscrewed and reversed to facilitate left hand operation if desired, or may be wider for convenient operation with either hand.

Figure 3:
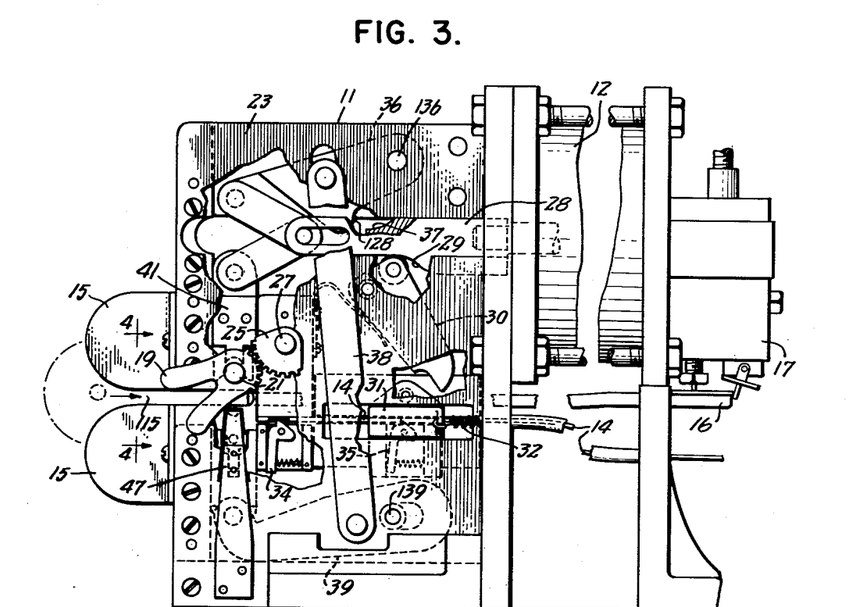
FIGURE 3 is a right side view, with parts broken away, of the front portion of the embodiment of FIGURE 1 before insertion of an article to be fastened.
Figure 4:
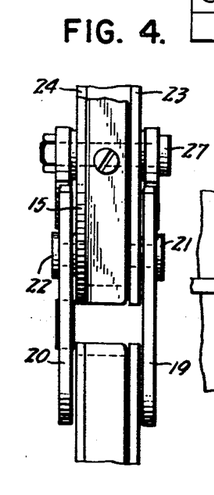
FIGURE 4 is a sectional view taken along line 4—4 in FIGURE 3.
Figure 5:
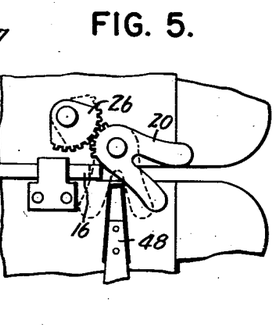
FIGURE 5 is a fragmentary left side view of the same embodiment.

The deails of mechanism 11 are shown in FIGURE 3 at a time just before the insertion of an unfastened article. As the article is moved by the workman in the direction of the arrow, it engages toggle arms 19 and 20 (see FIGURE 5) which are pivoted by it on a common axis on two studs 21 and 22 respectively mounted on frame plates 23 and 24 (see FIGURE 4). This axis of pivoting perpendicularly intersects the line along which the bending and forming jaws move toward each other, so that when the two arms 19 and 20 are swung down to their end limits as indicated by the dotted outline in FIGURE 5 they will hold the article and confine its folds in proper position for fastening. The mouths of the slots in these arms are made relatively wide so that loosely gathered casings may easily be inserted while the throats of the slots are narrowed to confine the folds prior to fastening and round bottomed with radius approximating or less than that of the crimping die faces 140 and 141 on the bending and forming jaws 40 and 41, so that when toggled together they surround a circular opening small enough to pre-compress the bag material. Arms 19 and 20 are ganged together by gear sectors 25 and 26 which are rigidly fixed on a common shaft 27. As seen best in FIGURE 5, when these arms are forced downward by the article, the back edge of arm 20 moves arm 16 backward, and actuates switch 17. Motor 12 then moves plunger 28 to the left in FIGURE 3 and initiates the fastening cycle now to be described.

Figure 7:
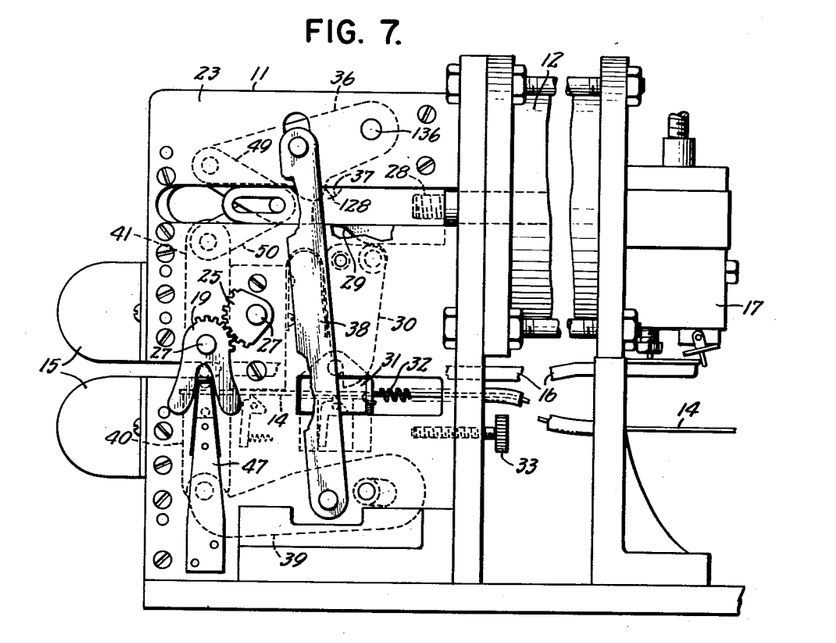
FIGURE 7 is the same view as FIGURE 3, but taken just after an article has been inserted.

As plunger 28 moves from its position shown in FIGURE 3 to that shown in FIGURE 7, cam surface 29 carried on the bottom of it engages feed drive lever 30 and rotates it clockwise to the position shown in FIGURE 7. As this lever is rotated, its lower end pushes a clamping slide 31 to the left against the action of spring 32 which, upon the completion of the fastening cycle, returns the slide to its back position as shown in FIGURE 3.

Slide 31 is adapted to grip the fastener stock and impart to it step by step advances to the left, one step for each cycle. The amount of advance each time is determined by the setting of stop screw 33 (FIGURE 7) which fixes the back position of the slide. Detent pawl 34, which is pivoted to the frame of mechanism 11, and feed pawl 35, which is carried by slide 31, co-operate with each other and the slide in advancing fastener stock 14 by alternately clamping it to the slide as the latter moves to the left and clamping it to the frame as the slide moves back to the right.

In FIGURE 7, the advance of stock 14 for one cycle is complete and an appropriate length of it to make a fastener is positioned over the lower or U-ing jaw 40 of the mechanism. Lever 36, pivoted at 136 to the frame of the machine, is raised by means of cam surface 37 on the advancing plunger 28 and a follower projection 128 on the bottom of the lever 36. This upward motion is transmitted to the U-ing jaw by lever 39 pivoted to the frame at 139 and to the jaw, and by links 38 pivoted between the levers 36 and 39.

Figure 6:
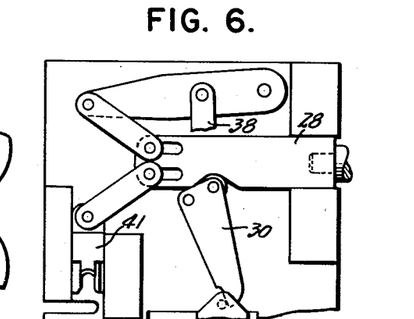
FIGURE 6 shows a toggle arrangement alternative to that in FIGURE 3.

Shortly after jaw 40 begins to move upward its top right edge serves as a shear with adjacent fixed edge 44 (FIGURE 8) to shear off a short length of fastener stock positioned over the jaw. Cam surface 37 has been provided to lift jaw 40 during this shearing action as the mechanical advantage of the other jaw moving elements at this time is low. An alternative arrangement is shown in FIGURE 6.

Figure 8:
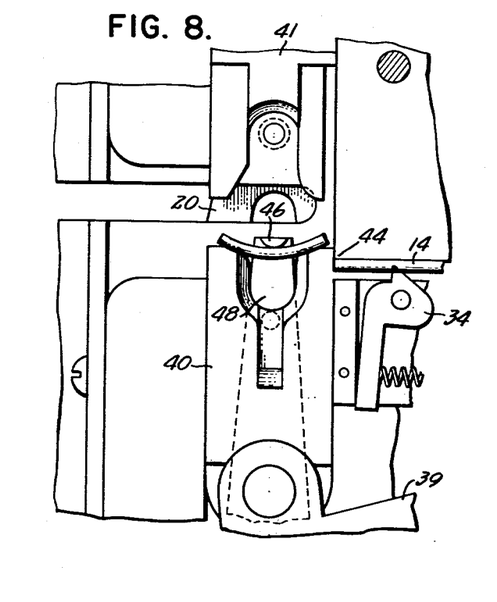
FIGURE 8 is an enlarged right side view of the bending jaws in the embodiment of FIGURE 1, taken just after a short length of the fastener stock has been cut off.
Figure 9:
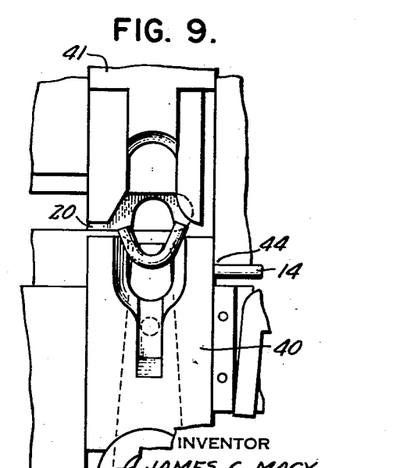
FIGURE 9 is the same as FIGURE 8 but taken at a later time.
Figure 10:
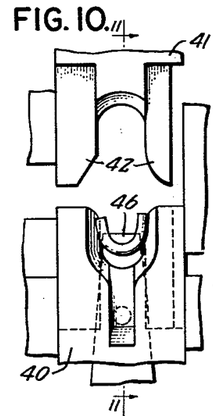
FIGURE 10 is the same as FIGURE 9 but taken at a later time.

The severed short length of fastener stock shown in FIGURE 8 is held near the centers of its side edges by nibs 45 and 46 on fingers 47 and 48, respectively, which are attached at their lower ends to the frame. As jaw 40 continues to move upward, opposite ends of the short length of fastener stock are bent upward to a U-shape, as indicated by the successive views of FIGURES 8, 9 and 10; and the U-ed stock thus partially embraces the casing material already compressed by the toggle arms 19 and 20. Continued movement of jaws 40, 41 forms the ends of the stock around the circle and then compresses and forges the fastener so as permanently to compress the bag material within the fastener's inside surface of relatively soft facing material.

In the process of bending, the facing material is bent on a smaller radius than the base of the fastener stock; and, since it is purposely made slideable on the base, this bending extends it more and more beyond the two ends of the base. Thus the facing covers the sheared corners and edges of the base and prevents them from cutting or puncturing the casing material.

Figure 11:
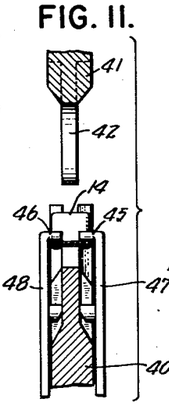
FIGURE 11 is a vertical section view taken along the line 11—11 of FIGURE 10.

As plunger 28 continues to advance beyond its position shown in FIGURE 7 it straightens a toggle linkage including links 49, pivoted between the end of plunger 28 and lever 36, and link 50, pivoted between the end of plunger 28 and upper bending jaw 41. The straightening of this toggle first moves jaw 40 upward to the position shown in FIGURE 10 to complete the U-ing operation, and then moves top jaw 41 downward to engage the partially bent fastener. The cross-section view of FIGURE 11 taken just prior to this engagement shows fingers 47 and 48 still holding the fastener strip, while in FIGURE 12 the cam surfaces 147 on jaw 40 have spread these fingers apart to disengage them from the fastener. In the position shown in FIGURE 12, jaw 41 has come into contact with the fastener and is partly intermeshed with jaw 40. Continued advance of the two jaws brings them into fully meshing relation, as shown in FIGURE 14 and results in completing the forming of fastener 55 (as shown in FIGURE 15) which is forged around the casing (not shown).

Figure 14:
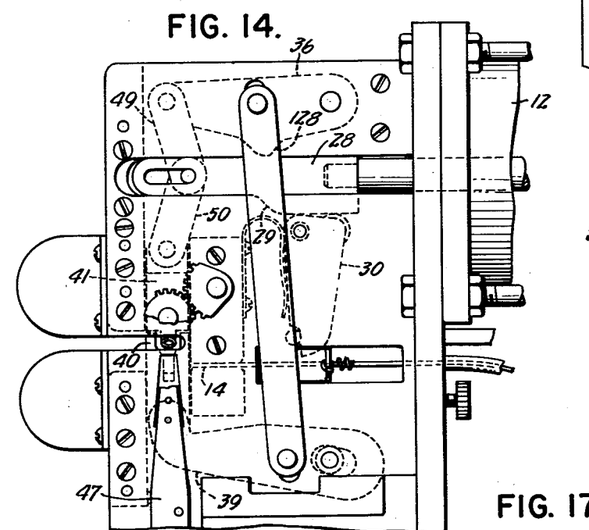
FIGURE 14 is the same as FIGURE 7 but taken near the end of the fastener bending operation.

After reaching the position shown in FIGURE 14, plunger 28 together with the elements driven by it, return to the rest position shown in FIGURE 3; and upon the removal of the fastened article, the above described cycle is ready to be repeated. The complete fastening cycle actually lasts only a fraction of a second.

An illustrative embodiment of fastener stock 14 is shown in cross section in FIGURE 20. This embodiment includes a ribbon like metal base 57, which is suitably 56 S grade aluminum alloy or zinc coated steel, and a channel shaped facing 58, which is suitably a relatively softer plastic material, such as vinylite with a density of at least 200 or polyethylene, capable of withstanding temperatures higher than those encountered by the fastened article.

Base 57 is held within facing 58 by the overhanging side walls of the latter without adhesive, and this allows the two to slide relatively freely with respect to each other. As will be explained hereinafter, base 57 and facing 58 are formed separately and then assembled. Facing 58 is advantageously serrated or ridged as shown to increase the gripping effect of a completed fastener.

A completed fastener 55 is shown in FIGURES 16 and 17 encircling an article partially indicated in dotted outline. As previously stated, base 57 is completely separated from the article and covered along its sides and ends by the overhanging edges of facing 58 and by the end portions of facing 58 which have been extended beyond and then clamped between the ends of the base as described above and shown in cross-section in FIGURE 17.

Figure 12:
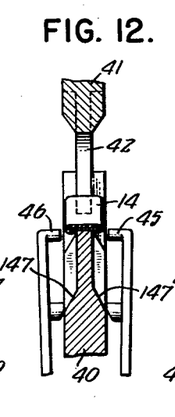
FIGURE 12 is the same as FIGURE 11 but taken at a later time.
Figure 13:
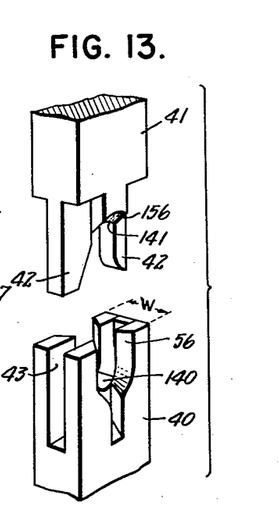
FIGURE 13 is an isometric view of the bending jaws of the embodiment of FIGURE 1.

The base strip in the formed fastener is not only bent around the bag but is intentionally also bent to arcuate cross-section as shown in FIGURE 16. Since the bend is inward, or concave, the holding force of the fastener is concentrated over its center portion and shifted from its sides which not only increases the effectiveness of the seal but further aids in preventing the cutting or tearing of the bag. To accomplish this desirable double bending of fastener 55, jaws 40 and 41 have been designed, as best shown in FIGURE 13, with die faces 140 and 141 slightly narrower than the metal base 57 so that they effectively engage only the center portion of the base in the fastener strip during its final bending and closing, as shown in FIGURES 12, 14 and 15. Width W of jaw 40, as indicated in FIGURE 13, is about the same width as the stock, however, and faces 56 and 156 are flared out from faces 140 and 141.

The jaws shown in FIGURE 13 taken together define a die-cavity adapted to produce a fastener of approximately elliptical cross-section, as shown in FIGURE 17. Extensions 42 on jaw 41 intermesh in grooves 43 in jaw 40 to afford lateral support to the fastener during bending and final forging of the fastener thereby preventing the fastener from spreading during closing of the die cavity.

Jaws may alternatively be shaped to conform to fasteners of a different cross-section, for example, like that shown in FIGURE 18 or FIGURE 19.

Figures 21, 22, 23, 24:
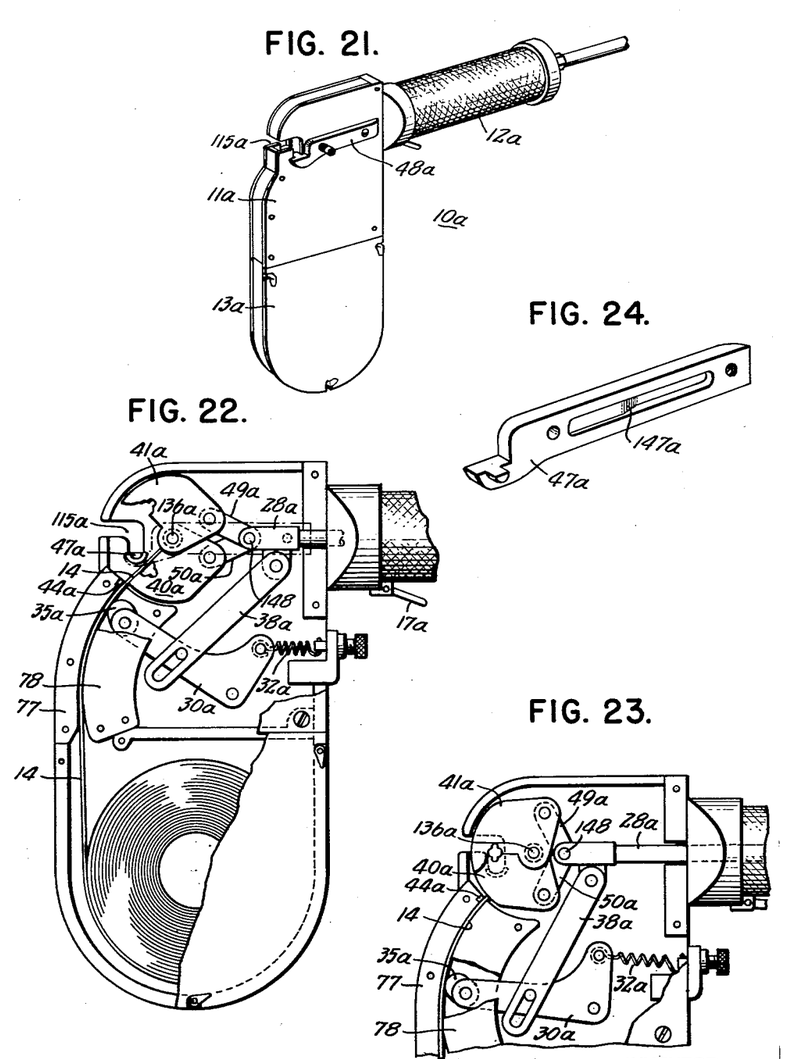
FIGURE 21 is a perspective view of a second illustrative embodiment of an automatic fastening machine in accordance with the present invention.
FIGURE 22 is a side view with parts broken away of the embodiment of FIGURE 21.
FIGURE 23 is a portion of the embodiment shown in FIGURE 22 but taken at a later time.
FIGURE 24 is a perspective view of one of the holding arms of the embodiment of FIGURE 21.

FIGURES 21-23 show a second illustrative embodiment of a fastening machine 10a in accordance with the invention. This embodiment is intended for use as a portable hand tool operation, as distinguished from bench operation with the embodiment of FIGURE 1, and includes a fastener-forming mechanism 11a, a hydraulic motor 12a, and a fastener stock supply magazine 13a. The underlying design considerations for this embodiment are the same as those for machine 10 although for the sake of economy the manner of operation here has been modified substantially.

The structural details of machine 10a are shown in FIGURE 22. Upon the insertion of a twisted or bunched bag into the throat of the slot 115a, the workman presses switch 17a, and plunger 28a, powered by motor 12a, begins to move to the left. This movement begins to straighten the toggle 49a, 50a. Link 49a is pivoted between the plunger 28a and upper jaw 41a, and link 50a is pivoted between the plunger and lower jaw 40a. These jaws are pivoted to the frame on fixed pivot 136a for closing together, and jaw 40a co-operates with fixed shear edge 44a to shear off the short length of fastener stock 14 positioned over it.

As this jaw continues to move, stationary arms 47a and 48a (see FIGURE 24) hold the center portion of the short length of fastener strip along its side edges until it is bent into a U shape and then are cammed out by stud 148 carried on plunger 28a and cam surfaces 147a on the insides of the arms. Just before the arms are completely disengaged, upper jaw 41a comes into contact with the fastener strip and, in a way analogous to that described in connection with FIGURES 11 and 12, co-operates with jaw 40a to form the strip into a completed fastener when the two jaws close together. The position of the jaws upon the completion of a fastener is shown in FIGURE 23. It should be noted that the cross section of the fastener will be substantially as shown in FIGURE 19.

At the time represented in FIGURE 23, link 38a, which is pivoted to plunger 28a, has pushed the fastener feed lever 30a, which is pivoted to the frame, downward to the position shown so that upon retraction of the plunger 28a spring 32a will rotate lever 30a clockwise and advance the fastener stock 14 a sufficient amount prior to the commencement of another fastening cycle. The stock is guided in this movement by a backing guide 77 and pawl 35a pivoted to the end of lever 30a so that it engages the stock when moving up but releases it when moving down. Guide 78 provides a front support for the stock. The amount of advance of the stock each time is determined by the throw of piston 28a. After a fastener has been applied, switch 17a is released and plunger 28a and the elements driven by it return to the position shown in FIGURE 22.

Figures 25, 26, 27, 28, 29:
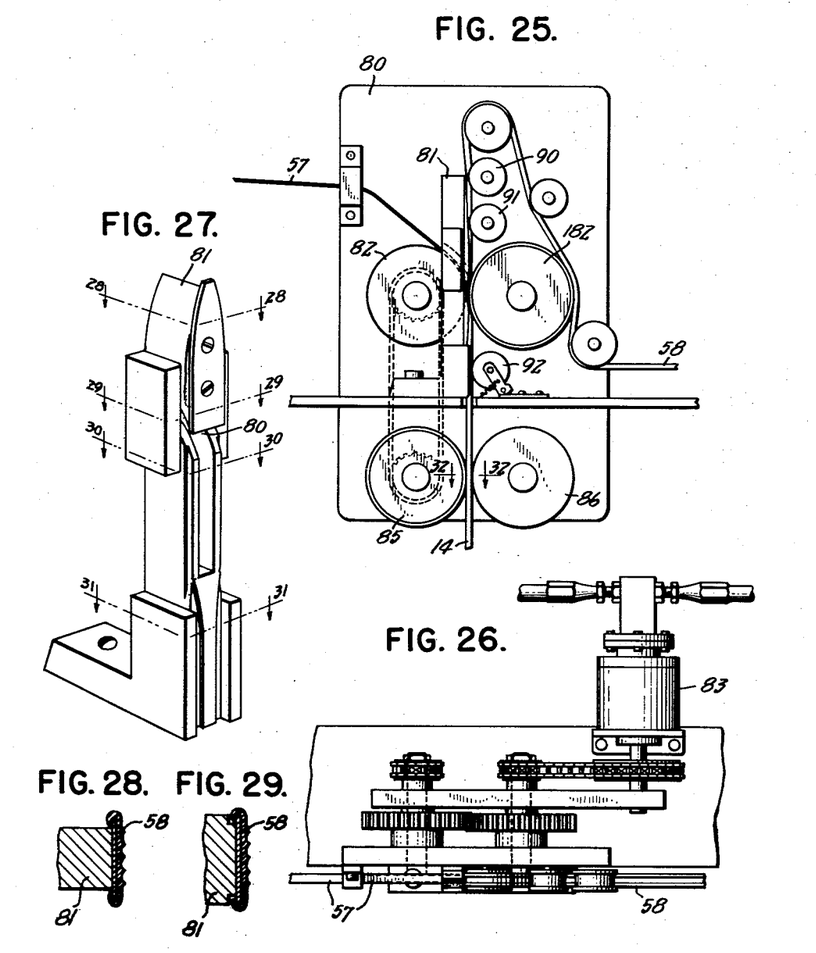
FIGURE 25 is a side elevation of a machine in accordance with the invention for forming the fastener stock by placing the facing material over the base strip.
FIGURE 26 is a top view of the embodiment of FIGURE 25.
FIGURE 27 is a perspective view of a spreading device used in the embodiment of FIGURE 25.
FIGURES 28 through 31 show cross-sections of the spreading jaw of FIGURE 27 taken as indicated by the respective lines.

FIGURE 25 shows an arrangement in accordance with the present invention for placing a channel shaped facing, such as facing 58 in FIGURE 20, around a flat strip base, such as base 57. This arrangement comprises a frame 80 upon which are mounted a number of guide rollers for guiding strip 57 and facing 58 past a spreading jaw 81 which is mounted on the frame but shown separately in FIGURE 27. The guide drums 82 and 182 are powered by hydraulic motor 83, shown in FIGURE 26, whose rotation is transmitted to the drums by a series of sprockets and drive chains.

Figure 30:
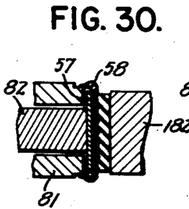

Strip 58 is introduced to the spreading jaw 81 as shown in FIGURE 28 and in passing down the face of the jaw is gradually pried open as shown in the successive cross-sections of FIGURES 29 and 30. During this passage, facing 58 is urged against the jaw by the rollers 90, 91, 92 shown in FIGURE 25. At a point where edges of the facing have been opened up sufficiently, base 57 is fed over roller 82 through an opening 84 in the face of the spreading jaw (FIGURE 27) and pressed against the inside face of facing 58 as shown in FIGURE 30.

Figure 31:
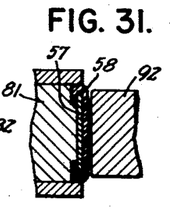
Figure 32:
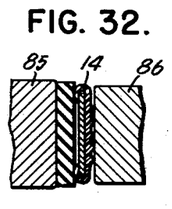
FIGURE 32 is a cross-section taken as indicated by line 32—32 in FIGURE 25.

As the base and facing move further downward, the edges of the facing are gradually released and allowed to bend back over the base as shown by FIGURE 31. With a final pressing between rollers 85 and 86 (see FIGURE 32) to insure a close union between the base and facing, the emerging fastener stock 14 is ready for use and may be fed immediately into a machine of the type of FIGURES 1-24 or may be reeled or cut into short lengths and supplied to a magazine of such a machine.

The foregoing is intended in illustration and not in limitation. Changes and modifications in the embodiments described may occur to those skilled in the art and these changes and modifications may be made without departing from the spirit or scope of the invention as set forth.

I claim:

1. For clamping articles such as casings and other articles with a ribbon of ductile material, the method which comprises the step of covering one side and the edges of the ribbon with relatively soft material which is free to slide lengthwise of the ribbon, and the step of winding the ribbon with said side on the inside around the article and causing the covering to slide beyond the ends of the ribbon, thereby to protect the article from contact with all of said ribbon including said ends.

2. For clamping articles such as casings and other articles with a ribbon of ductile material, the method which comprises covering one side of the ribbon with a ribbon of relatively soft material which is wider than the malleable ribbon, bending the margins of the soft ribbon over the edges of the malleable ribbon, and winding the ribbon with said side on the inside around the article and causing the soft material to slide beyond the ends of the malleable ribbon, thereby to protect the article from contact with all of said ribbon including said ends.

3. For holding the ends of sausage casings and the like, a clamp comprising an open ring of ductile material having its ends spaced apart across a narrow gap and an equal length open cover ring of relatively soft material which covers the inner periphery of the ductile ring and overlaps the edges thereof, which is non-adherent to the ductile ring, and whose ends extend beyond the ends of the ductile ring.

4. For clamping articles such as casings and the like, a clamp comprising an open ring of ductile material having its ends spaced apart and an open ring of relatively soft material which covers the inner periphery of the ductile ring and overlaps the edges thereof with its edges spaced apart to leave a circumferential zone of the outer periphery of the ductile ring uncovered, which is non-adherent to the ductile ring, and whose ends extend beyond and somewhat between the ends of the ductile ring.

5. For clamping articles such as casings and the like, a clamp comprising a ring of ductile ribbon having its ends spaced apart across a narrow gap and an open cover ring of relatively soft ribbon which is wider than the ductile ribbon, which covers the inner periphery of the ductile ring with its margins folded over the edges of the ductile ring and its edges spaced apart to leave a circumferential zone of the outer periphery of the ductile ring uncovered, which is non-adherent to the ductile ring, which is of equal length to the ductile ring, and whose ends extend beyond the ends of the ductile ring.

6. A method of applying a fastener to an article comprising taking a flat, short length, stiff, bendable, ribbon-like base of material, contacting it on its outer side and bending it into a self-holding, single turn closed ring around said article and while bending it around said article substantially bending it across its width at points along its length whereby the holding force of said fastener is increased over what it would be if said base were not bent across its width.

7. An article fastener comprising a short length of relatively stiff un-springy base material having two butt ends and an equal length of relatively softer covering material on one side of said base in slideable relation to said base and leaving a substantial area on the other side of said base, said base comprising a substantially closed ring with its ends separated by a narrow gap and with the covering on the inside of said base, said covering extending slightly beyond the butt ends of said base, said base serving to hold said covering rigidly in ring shape, whereby an article enclosed by said fastener is prevented from coming in contact with the edges of said base material.

8. The combination of elements as in claim 7 in which said base is a flat ribbon of metal and said covering is a channel strip of material with side edges overhanging said metal ribbon, and said base having its central part of less diameter than its edges.

9. In applying a fastener of the type having a core of ductile material and a covering of relatively soft material, the method which comprises bending the fastener around an article and concomitantly causing the covering to distend lengthwise of the core so that the ends of the covering project beyond the ends of the core and protect the article from the ends of the ductile core.

10. In applying a fastener of the type having a strip of ductile material and a ribbon of relatively soft material covering substantially only one side of the strip, the method which comprises bending the fastener around an article with said one side facing the article and concomitantly causing the soft ribbon to move lengthwise of the strip so that its ends project beyond the ends of the strip and protect the article from the ends of the strip.

11. A method of applying a fastener to a thin fragile casing or the like in such a way that the wall of the casing is not torn or punctured, said method comprising taking a longer length of a ribbon-like base of a thin bendable metal having a soft plastic covering mounted thereon and leaving one side of the base at least partly bare, cutting a short length of said base and covering from said longer length, and forming said base of said short length into a closed ring around said casing with said covering therebetween, said forming being accomplished by contacting said base along its bare surface and in such way that said covering is forced beyond the ends of said base as it is being closed into a ring.

References Cited in the file of this patent

UNITED STATES PATENTS

| | | |
|---|---|---|
| 153,572 | Johnston | July 28, 1874 |
| 526,080 | Lefeber | Sept. 18, 1894 |
| 557,378 | Gill | Mar. 31, 1896 |
| 701,537 | Buskey | June 3, 1902 |
| 809,756 | Staude | Jan. 9, 1906 |
| 1,274,754 | Novick | Aug. 6, 1918 |
| 1,444,912 | Hammel | Feb. 13, 1923 |
| 1,547,208 | Farmer | July 28, 1925 |
| 1,908,981 | Hicks | May 16, 1933 |
| 2,027,962 | Currie | Jan. 14, 1936 |
| 2,110,783 | Welker | Mar. 8, 1938 |
| 2,130,779 | Smith | Sept. 20, 1938 |
| 2,252,299 | McCoy | Aug. 12, 1941 |
| 2,265,277 | Gerke | Dec. 9, 1941 |
| 2,285,850 | Weeks | June 9, 1942 |
| 2,291,670 | Wiley | Aug. 4, 1942 |
| 2,359,209 | Ellinwood | Sept. 26, 1944 |
| 2,445,481 | Ge Wertz | July 20, 1948 |
| 2,460,963 | Young | Feb. 8, 1949 |
| 2,570,614 | Wall | Oct. 9, 1951 |
| 2,618,450 | Thomas | Nov. 18, 1952 |
| 2,632,239 | Taylor | Mar. 24, 1953 |
| 2,670,294 | Frank | Feb. 23, 1954 |
| 2,682,703 | Schob | July 6, 1954 |

FOREIGN PATENTS

| | | |
|---|---|---|
| 508,079 | France | July 15, 1920 |
| 659,133 | France | Jan. 29, 1929 |
| 749,640 | France | May 8, 1933 |
| 857,558 | France | Apr. 22, 1940 |